US012687903B2

(12) United States Patent
Lee et al.

(10) Patent No.: US 12,687,903 B2
(45) Date of Patent: Jul. 21, 2026

(54) DISPLAY DEVICE MANUFACTURING APPARATUS AND DISPLAY DEVICE MANUFACTURING METHOD

(71) Applicant: Samsung Display Co., LTD., Yongin-si (KR)

(72) Inventors: Junyoung Lee, Yongin-si (KR); Youngdo Kim, Yongin-si (KR); Junehyoung Park, Yongin-si (KR); Junwoo You, Yongin-si (KR); Suk Won Jung, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 578 days.

(21) Appl. No.: 18/195,605

(22) Filed: May 10, 2023

(65) Prior Publication Data

US 2024/0053806 A1 Feb. 15, 2024

(30) Foreign Application Priority Data

Aug. 11, 2022 (KR) ........................ 10-2022-0100777

(51) Int. Cl.
G06F 1/20 (2006.01)
G06F 1/16 (2006.01)
(52) U.S. Cl.
CPC ............ G06F 1/206 (2013.01); G06F 1/1656 (2013.01)

(58) Field of Classification Search
None
See application file for complete search history.

(56) References Cited

U.S. PATENT DOCUMENTS

| | | | |
|---|---|---|---|
| 9,738,014 B2 | 8/2017 | Maeyama et al. | |
| 2016/0303783 A1* | 10/2016 | Koganezawa | B29C 33/12 |
| 2017/0282426 A1* | 10/2017 | Chiang | B29C 45/02 |

FOREIGN PATENT DOCUMENTS

KR 102173980 B1 11/2020

* cited by examiner

*Primary Examiner* — Jacob T Minskey
*Assistant Examiner* — Adrien J Bernard
(74) *Attorney, Agent, or Firm* — CANTOR COLBURN LLP

(57) ABSTRACT

A display device manufacturing apparatus includes: a cooling unit disposed on a front surface of a display panel, a molding unit disposed on a rear surface of the display panel, and a heating unit disposed on the molding unit. The molding unit includes a first part facing and spaced apart from the rear surface of the display panel by a predetermined distance, and a second part bent from the first part toward the rear surface of the display panel to define an injection space together with the first part. An opening for communicating with the injection space is defined in the molding unit.

21 Claims, 16 Drawing Sheets

FIG. 7F

DISPLAY DEVICE MANUFACTURING APPARATUS AND DISPLAY DEVICE MANUFACTURING METHOD

This application claims priority to Korean Patent Application No. 10-2022-0100777, filed on Aug. 11, 2022, and all the benefits accruing therefrom under 35 U.S.C. § 119, the content of which in its entirety is herein incorporated by reference.

BACKGROUND

The present disclosure herein relates to a display device manufacturing apparatus and a display device manufacturing method, and more particularly, to a display device manufacturing apparatus and a display device manufacturing method which are capable of manufacturing a cover panel in a thermal curing manner.

Multimedia electronic devices such as television sets, mobile phones, tablet computers, navigation systems, and game consoles may include a display device for displaying an image and electronic components for performing various functions. As the electronic devices become more highly functional and thinner, electronic components built therein have larger capacity and a higher degree of integration. Accordingly, the electronic components are easily exposed to impact, and excessive heat is generated inside the electronic devices, thereby resulting in breakdowns and malfunctions of the electronic components and the display device.

SUMMARY

The present disclosure provides a display device manufacturing apparatus and a display device manufacturing method which are capable of manufacturing a cover panel in a thermal curing manner.

The present disclosure also provides a display device manufacturing apparatus and a display device manufacturing method which are capable of increasing mass productivity during a display device manufacturing process by manufacturing a cover panel in a thermal curing manner.

An embodiment of the invention provides a display device manufacturing apparatus including: a cooling unit disposed on a front surface of a display panel, a molding unit disposed on a rear surface of the display panel, and a heating unit disposed on the molding unit, where the molding unit includes a first part facing and spaced apart from the rear surface of the display panel by a predetermined distance, and a second part bent from the first part toward the rear surface of the display panel to define an injection space together with the first part, and an opening for communicating with the injection space is defined in the molding unit.

In an embodiment, the molding unit may further include a third part disposed in the injection space, and having one end adjacent to the rear surface of the display panel, and the other end connected to the first part.

In an embodiment, the first part may include a plurality of edges, and the second part may include a plurality of frames bent from the edges, respectively.

In an embodiment, the frames may have an integrated shape.

In an embodiment, the opening may be provided in plurality, and the plurality of openings may be disposed in the edges of the first part.

In an embodiment, two edges of adjacent frames among the frames may be spaced apart from each other to define the opening.

In an embodiment, the molding unit may further include a support part disposed on a side surface of the display panel to support the second part.

In an embodiment, the support part may have a shape integrated with the second part.

In an embodiment, the second part may extend in a direction perpendicular to the rear surface of the display panel.

In an embodiment, the first part may have a bent shape on a cross-section perpendicular to the rear surface of the display panel.

In an embodiment, the display device manufacturing apparatus may further include an injection unit, which abuts the opening.

In an embodiment, the display device manufacturing apparatus may further include a window disposed between the front surface of the display panel and the cooling unit.

In an embodiment of the invention, a display device manufacturing method includes: disposing, on a display panel, a molding unit in which an opening for communicating with the injection space is defined, where the molding unit includes a first part facing and spaced apart from a rear surface of the display panel by a predetermined distance, a second part bent from the first part toward the rear surface of the display panel to define the injection space together with the first part, and a third part disposed in the injection space, and having one end abutting the rear surface of the display panel, and the other end connected to the first part, disposing a heating unit on the molding unit, and disposing a cooling unit on a front surface of the display panel, disposing an injection unit in a position corresponding to the opening, and injecting, by the injection unit, a resin into the injection space, and heating the injected resin with the heating unit to cure the injected resin and cooling the display panel with the cooling unit.

In an embodiment, the injected resin may form a single layer on the rear surface of the display panel.

In an embodiment, the formed single layer may form at least one accommodation space therein, and the display device manufacturing method may further include inserting an electronic module into the accommodation space.

In an embodiment, the cooling of the display panel with the cooling unit may include maintaining the temperature of the display panel to be about 75 degrees in Celsius (° C.) or lower.

In an embodiment, the heating of the injected resin with the heating unit may include maintaining the temperature of the injected resin to be about 75° C. or higher.

In an embodiment, the display device manufacturing method may further include removing the heating unit, the cooling unit, and the molding unit.

In an embodiment, the removing of the molding unit may further include cutting at least a part of the injected resin.

In an embodiment, the first to third parts of the molding unit may be integrally formed.

BRIEF DESCRIPTION OF THE FIGURES

The accompanying drawings are included to provide a further understanding of the invention, and are incorporated in and constitute a part of this specification. The drawings illustrate embodiments of the invention and, together with the description, serve to explain principles of the invention. In the drawings:

FIGS. 7A to 7F are cross-sectional views of a display device manufacturing method according to an embodiment of the invention.

DETAILED DESCRIPTION

Figure 1:
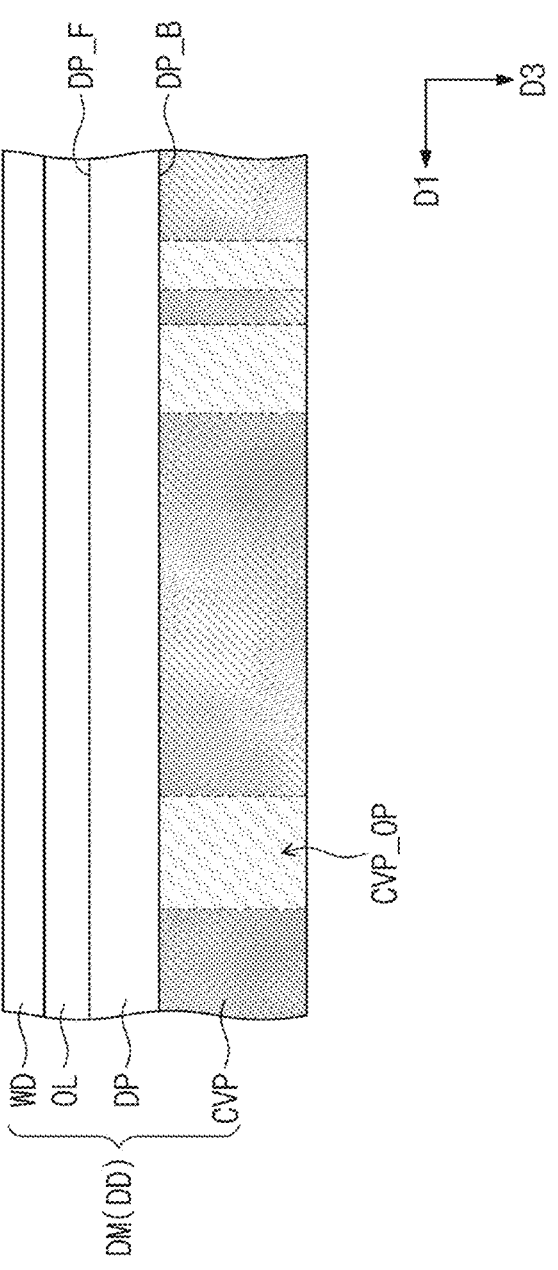
FIG. 1 is a schematic view illustrating a part of a display device according to an embodiment of the invention.

In this specification, when a component (or region, layer, portion, etc.) is referred to as "on", "connected", or "coupled" to another component, it means that it is placed/connected/coupled directly on the other component or a third component can be disposed between them.

The same reference numerals or symbols refer to the same elements. In addition, in the drawings, thicknesses, ratios, and dimensions of components are exaggerated for effective description of technical content. The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." "And/or" includes all combinations of one or more that the associated elements may define.

Terms such as "first" and "second" may be used to describe various components, but the components should not be limited by the terms. These terms are only used for the purpose of distinguishing one component from other components. For example, without departing from the scope of the present invention, a first component may be referred to as a second component, and similarly, a second component may be referred to as a first component. Singular expressions include plural expressions unless the context clearly indicates otherwise.

In addition, terms such as "below", "lower", "above", and "upper" are used to describe the relationship between components shown in the drawings. The terms are relative concepts and are described based on the directions indicated in the drawings.

Terms such as "include" or "have" are intended to designate the presence of a feature, number, step, action, component, part, or combination thereof described in the specification, and it should be understood that it does not preclude the possibility of presence or addition of one or more other features, numbers, steps, operations, components, parts, or combinations thereof.

Unless otherwise defined, all terms (including technical and scientific terms) used in this specification have the same meaning as commonly understood by one of ordinary skill in the art to which this invention belongs. In addition, terms such as terms defined in commonly used dictionaries should be interpreted as having a meaning consistent with the meaning having in the context of the related technology, and should not be interpreted as too ideal or too formal unless explicitly defined here.

Hereinafter, embodiments according to the invention will be described with reference to the drawings.

FIG. 1 is a schematic view illustrating a state in which a cover panel according to an embodiment of the invention is disposed on a display panel.

A display device DD may generate an image, and may sense an external input. The display device DD may include a display module DM, a window WD, and electronic components.

The display module DM may include a display panel DP, an optical layer OL, and a cover panel CVP. FIG. 1 briefly illustrates only the display panel DP, the optical layer OL, the cover panel CVP, and the window WD, among stacked structures of the display module DM, but an embodiment of the display module DM is not limited thereto.

The display panel DP may display an image in response to an electrical signal. The display panel DP according to an embodiment may be a light-emitting display panel, but is not particularly limited thereto. For example, the display panel DP may be an organic light-emitting display panel, an inorganic light-emitting display panel, or a quantum dot light-emitting display panel. A light-emitting layer of the organic light-emitting display panel may include an organic light-emitting material, and a light-emitting layer of the inorganic light-emitting display panel may include an inorganic light-emitting material. A light-emitting layer of the quantum dot light-emitting display panel may include quantum dots, quantum rods, etc.

The optical layer OL may be disposed on a front surface DP_F of the display panel DP. The optical layer OL may be directly formed on the front surface DP_F of the display panel DP, but is not limited thereto. The optical layer OL may be formed in advance and then disposed on the front surface DP_F of the display panel DP in another embodiment.

The cover panel CVP may be disposed on a rear surface DP_B of the display panel DP. The cover panel CVP may be directly formed on the rear surface DP_B of the display panel DP. That is, the cover panel CVP may be coupled, without an additional adhesive layer, to a component defining the rear surface DP_B of the display panel DP.

Electronic components disposed on the rear surface DP_B of the display panel DP, for example, electronic modules EM, power modules, electronic optical modules, flexible circuit boards may generate heat, and the cover panel CVP may prevent the heat generated by the electronic components described above from being transferred to the display panel DP.

Specifically, the cover panel CVP may shield or absorb electromagnetic waves generated by the electronic components disposed on the rear surface DP_B of the display panel DP, thereby preventing the electromagnetic waves from affecting the display panel DP as a noise. In addition, the cover panel CVP may block light emitted from the rear surface DP_B of the display panel DP, and thus prevent the electronic parts disposed on the rear surface DP_B of the display panel DP from being viewed or seen through from the outside. In addition, since the cover panel CVP protects the display panel DP from external factors such as heat, impact, and electromagnetic waves transferred to the display panel DP, the display panel DP and a display device may have improved reliability.

The cover panel CVP may have a single-layered structure. Since the cover panel CVP has a single-layered structure and is directly formed on the rear surface DP_B of the display panel DP, a display device and an electronic device in which the display panel DP is disposed may be thinly provided, and the reliability of the display panel DP may also be improved.

Here, the cover panel CVP having a single-layered structure may not only dissipate heat but also protect the display panel DP from an external impact or an interference transferred toward the rear surface DP_B of the display panel DP. That is, the cover panel CVP may not only function to dissipate heat, but also function to absorb impact, block light, and block electromagnetic waves.

The cover panel CVP having a single-layered structure may be formed through thermal-curing, but is not limited thereto. The cover panel CVP may be formed through UV curing in another embodiment, and forming the cover panel CVP is not limited to any one embodiment.

The cover panel CVP may have at least one accommodation space CVP_OP defined therein. Electronic modules EM such as camera sensors or fingerprint sensors may be inserted into the accommodation space CVP_OP defined in the cover panel CVP.

Since the electronic modules EM such as camera sensors or fingerprint sensors are not disposed on the cover panel CVP, and are inserted into the accommodation space CVP_OP defined in the cover panel CVP, the display module DM may be thinly provided.

A display device, which is thinner than a display device in which the electronic modules EM such as camera sensors or fingerprint sensors are disposed on the cover panel CVP, or an electronic device including such a thinner display device may be provided.

However, an embodiment of the invention is not limited thereto, and the cover panel CVP may be formed to have a plurality of layers. In this case, the plurality of layers may be each a functional layer that function to block heat, absorb impact, block light, and block electromagnetic waves, or may be each an adhesive layer for adhering adjacent functional layers.

In addition, even when the cover panel CVP is provided in a plurality of layers, at least one opening MU_OP may be defined therein, and a camera sensor, a fingerprint sensor, a motion sensor, or the like may be inserted into the opening MU_OP.

The window WD may be disposed on the display module DM. The window WD may cover the front surface DP_F of the display module DM, and may protect the display module DM from an external impact and a scratch. The window WD may be coupled to the display module DM through an adhesive layer.

The window WD may have a single-layered or multilayered structure. For example, the window WD may include a plurality of plastic films coupled by an adhesive, or a glass film and a plastic film coupled by an adhesive. The window WD may further include a functional layer such as an anti-fingerprint layer, a phase control layer, or a hard coating layer disposed on a transparent film.

Hereinafter, a display device manufacturing apparatus for manufacturing a display device according to an embodiment of the invention will be described. In description of a display device manufacturing apparatus according to an embodiment, the same reference numerals or symbols will be given to the components described above.

Figure 2:
FIG. 2 is a schematic lateral view of a display device manufacturing apparatus according to an embodiment of the invention.
Figure 2:
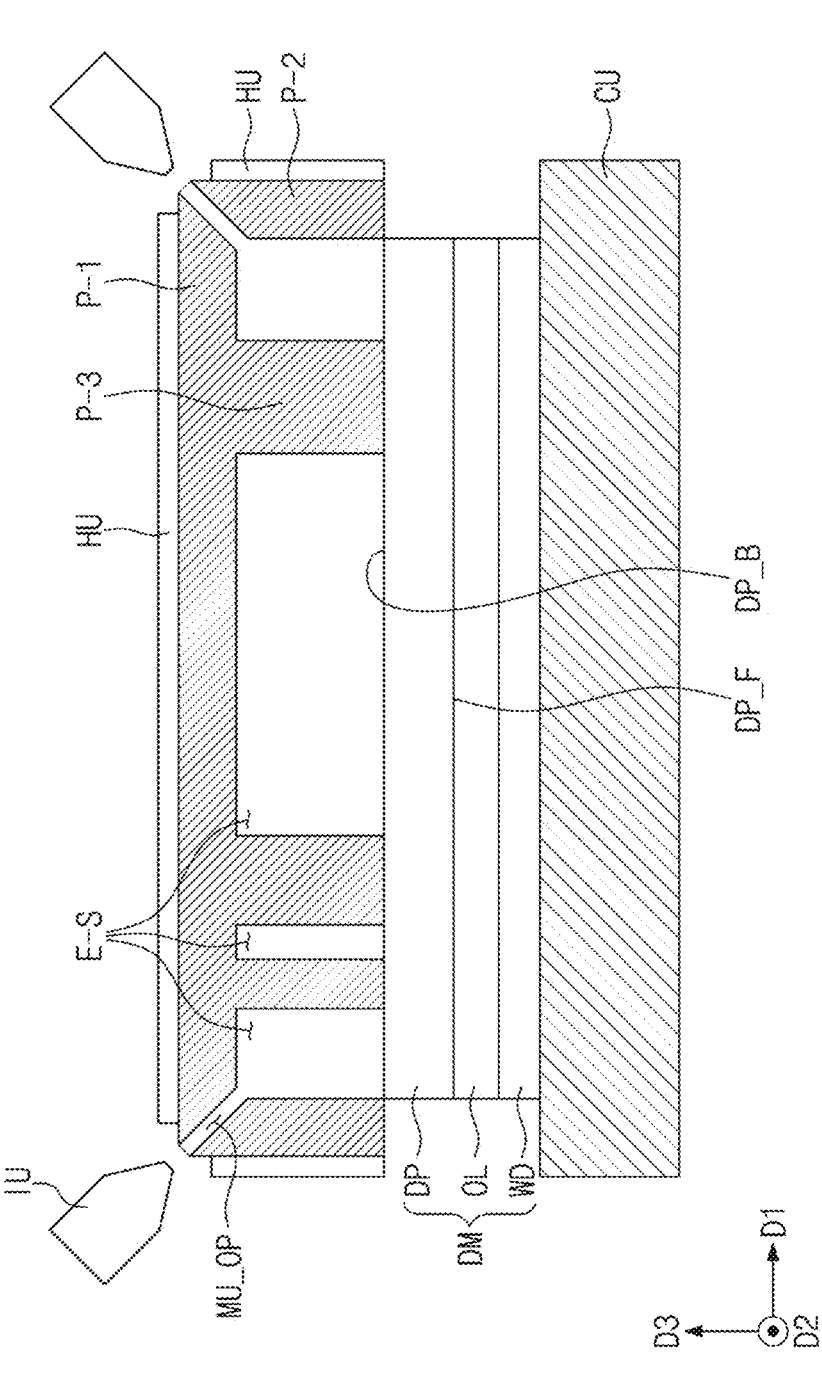

FIG. 2 is a schematic lateral view of a display device manufacturing apparatus according to an embodiment of the invention.

Referring to FIG. 2, the display device manufacturing apparatus includes a molding unit MU, a heating unit HU, and a cooling unit CU.

The molding unit MU may define an injection space E-S for accommodating a resin between the rear surface DP_B of the display panel DP and the molding unit MU. The resin may be accommodated in the injection space E-S and then cured, and thus a single layer may be formed in the injection space E-S. As an example, the molding unit MU may have a basket shape in which the molding unit MU is partially recessed to define the injection space E-S therein.

The molding unit MU may include a first part P-1, a second part P-2, and a third part P-3. The second part P-2 and the third part P-3 may extend from the first part P-1.

Specifically, the molding unit MU may include the first part P-1 facing and spaced apart from the rear surface DP_B of the display panel DP by a predetermined distance, the second part P-2 bent from the first part P-1 toward the rear surface DP_B of the display panel DP, and defining the injection space E-S together with the first part P-1, and at least one third part P-3 disposed in the injection space E-S, and having one end abutting the rear surface DP_B of the display panel DP and the other end connected to the first part P-1. In addition, an opening MU_OP for communicating with the injection space E-S is defined in the molding unit MU.

The injection unit IU may inject a resin into the injection space E-S through the opening MU_OP of the molding unit MU. The injected resin may be cured, and form a cover panel. That is, according to the invention, the molding unit MU is disposed on the rear surface DP_B of the display panel DP, and a resin is injected, thereby forming a cover panel on the rear surface DP_B of the display panel DP.

A cover panel manufacturing method will be described later in detail in a display device manufacturing method.

The heating unit HU may heat the resin injected into the injection space E-S. The heated resin may be cured by the heating unit HU.

The heating unit HU may be disposed on the molding unit MU. As illustrated in the drawing, the heating unit HU may be disposed outside the molding unit MU, but an embodiment of the invention is not limited thereto. The heating unit HU may be disposed in the interior of the molding unit MU or inside the molding unit MU in another embodiment.

The cooling unit CU may cool the display panel DP. When the heating unit HU heats a resin RS, and further heats even the molding unit MU, the display panel DP adjacent thereto is also heated together. At this time, the cooling unit CU may cool the display panel DP such that the display panel DP is not heated to a predetermined temperature or more.

The cooling unit CU may be disposed on the front surface DP_F of the display panel DP. In addition, the cooling unit CU may be disposed on the window WD disposed on the front surface DP_F of the display panel DP. That is, the cooling unit CU may directly or indirectly cool the display panel DP.

The heating unit HU may be provided with an electro-thermal device, a heat exchanger device, a hot water pump device, or the like, but is not limited thereto. In addition, the cooling unit CU may be provided with a cooling pump device, a heat exchanger device, or the like in another embodiment, but is not limited thereto.

The display device manufacturing apparatus may include the injection unit IU.

The injection unit IU may inject a resin into the injection space E-S. The injection unit IU may be disposed to abut the opening MU_OP defined in the molding unit MU. The injection unit IU may inject a resin into the injection space E-S through the opening MU_OP for communicating with the injection space E-S.

The injection unit IU may inject a resin into the injection space E-S while abutting one opening MU_OP, or may inject the resin into the injection space E-S while simultaneously abutting a plurality of openings MU_OP. Since the injection unit IU may simultaneously inject the resin into the plurality of openings MU_OP, the resin may be rapidly injected into the injection space E-S up to a predetermined amount or level. Here, the predetermined amount or level may be changed according to product designs, and is not limited to any one example of product designs.

The injection unit IU may simultaneously inject the resin into the plurality of openings MU_OP, thereby reducing a resin injection time to improve mass productivity.

Figure 3A:
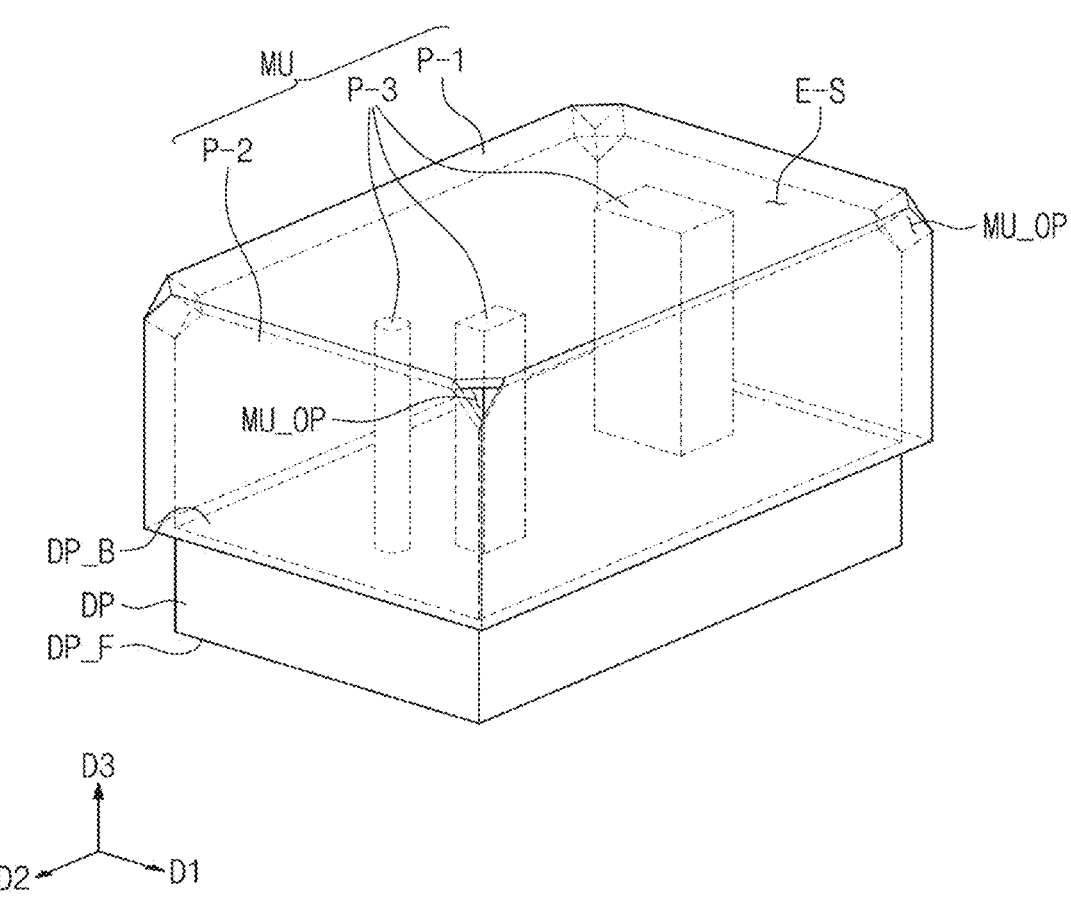
FIG. 3A is a perspective view of a molding unit of the display device manufacturing apparatus in FIG. 2.
Figure 3B:
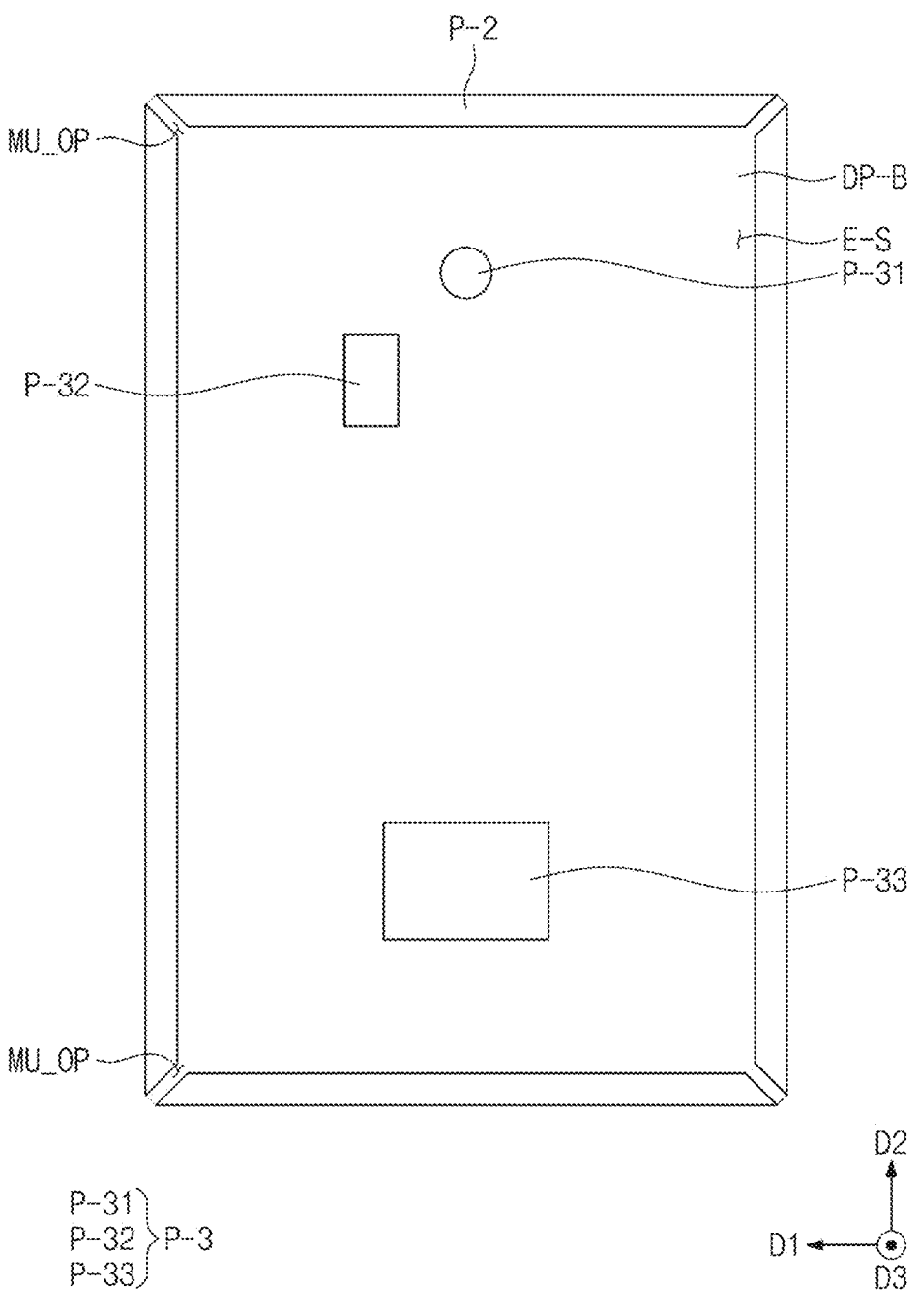
FIG. 3B is a top projective view of the molding unit in FIG. 3A.

FIG. 3A is a perspective view of a molding unit of the display device manufacturing apparatus in FIG. 2, and FIG. 3B is a top projection view of the molding unit in FIG. 3A.

Referring to FIGS. 3A and 3B, the first part P-1, the second part P-2, and the third part P-3 of the molding unit MU may be integrally formed (i.e., monolithic), and disposed on the rear surface DP_B of the display panel DP. The injection space E-S may be defined between the rear surface DP_B of the display panel DP and the integrally-formed first part P-1, second part P-2 and third part P-3 of the molding unit MU, and the opening MU_OP may be disposed between the first part P-1 and the second part P-2.

The first part P-1 of the molding unit MU may extend in a direction parallel to the rear surface DP_B of the display panel DP, for example, in a first direction D1 or a second direction D2. In addition, the second part P-2 and the third part P-3 may extend in a direction perpendicular to the rear surface DP_B of the display panel DP, for example, in a third direction D3. In this case, a direction in which the second part P-2 and the third part P-3 extend is not limited to the third direction D3 illustrated in the drawing, may be bent and extend, and is not limited to any one embodiment.

The third part P-3 may be disposed in the injection space E-S to occupy one region in the injection space E-S. Thereafter, when the injected resin is cured to form a cover panel, an empty space not filled with the resin may be formed in a region occupied by the third part P-3 in the cover panel. The empty space may be defined as an accommodation space CVP_OP, and an electronic module EM such as a camera sensor may be accommodated in the accommodation space CVP_OP. The third part P-3 may be provided in plurality, and, as illustrated in FIG. 3B, the plurality of third parts P-31, P-32, and P-33 may have different shapes, respectively.

The opening MU_OP may be defined in the first part P-1, but is not limited thereto. In another embodiment, the opening MU_OP may be defined between the first part P-1 and the second part P-2, and is not limited to any one embodiment.

In addition, the planar shape of the opening MU_OP when viewed in a direction perpendicular to the opening MU_OP may be a triangular shape as illustrated in the drawing, but is not limited thereto, and may be a circular shape or the like in another embodiment, and is not limited to any one embodiment.

Figure 4A:
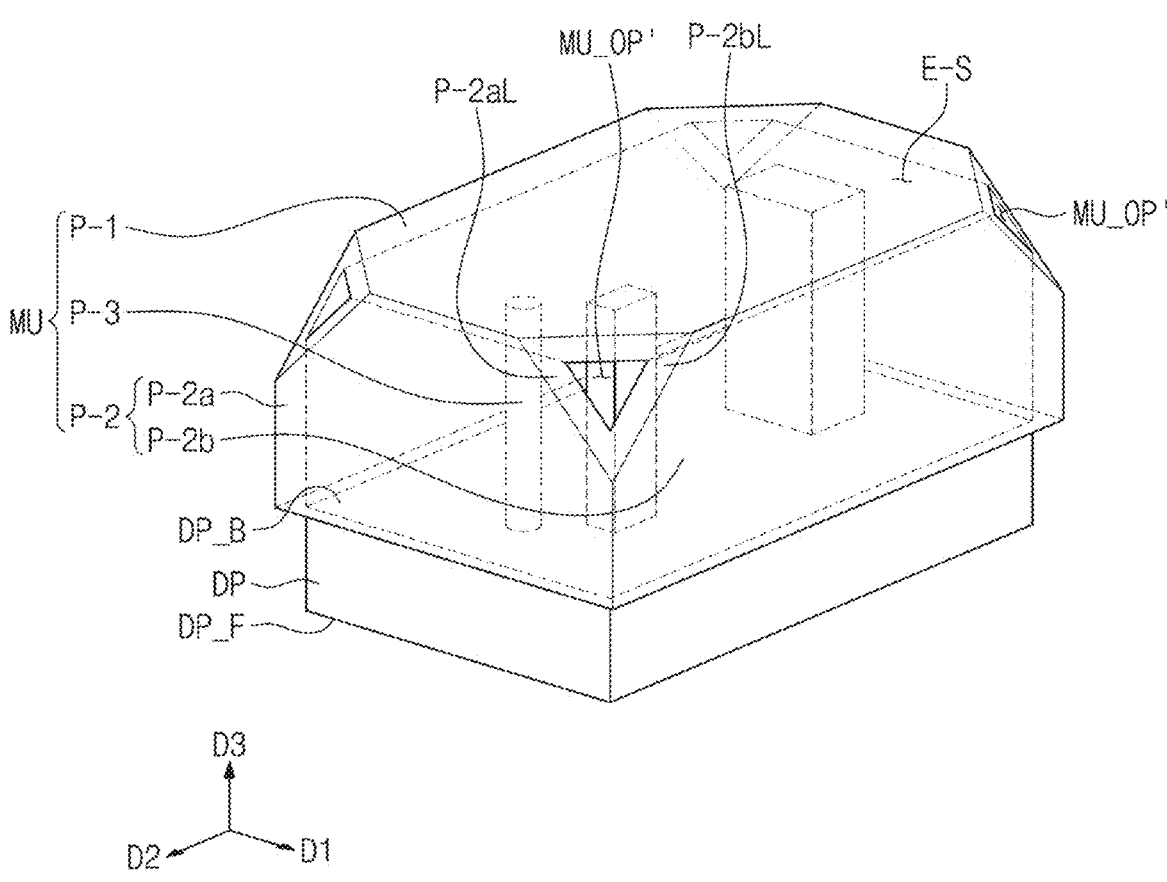
FIG. 4A is a perspective view illustrating another embodiment of a molding unit of a display device manufacturing apparatus according to an embodiment of the invention.
Figure 4B:
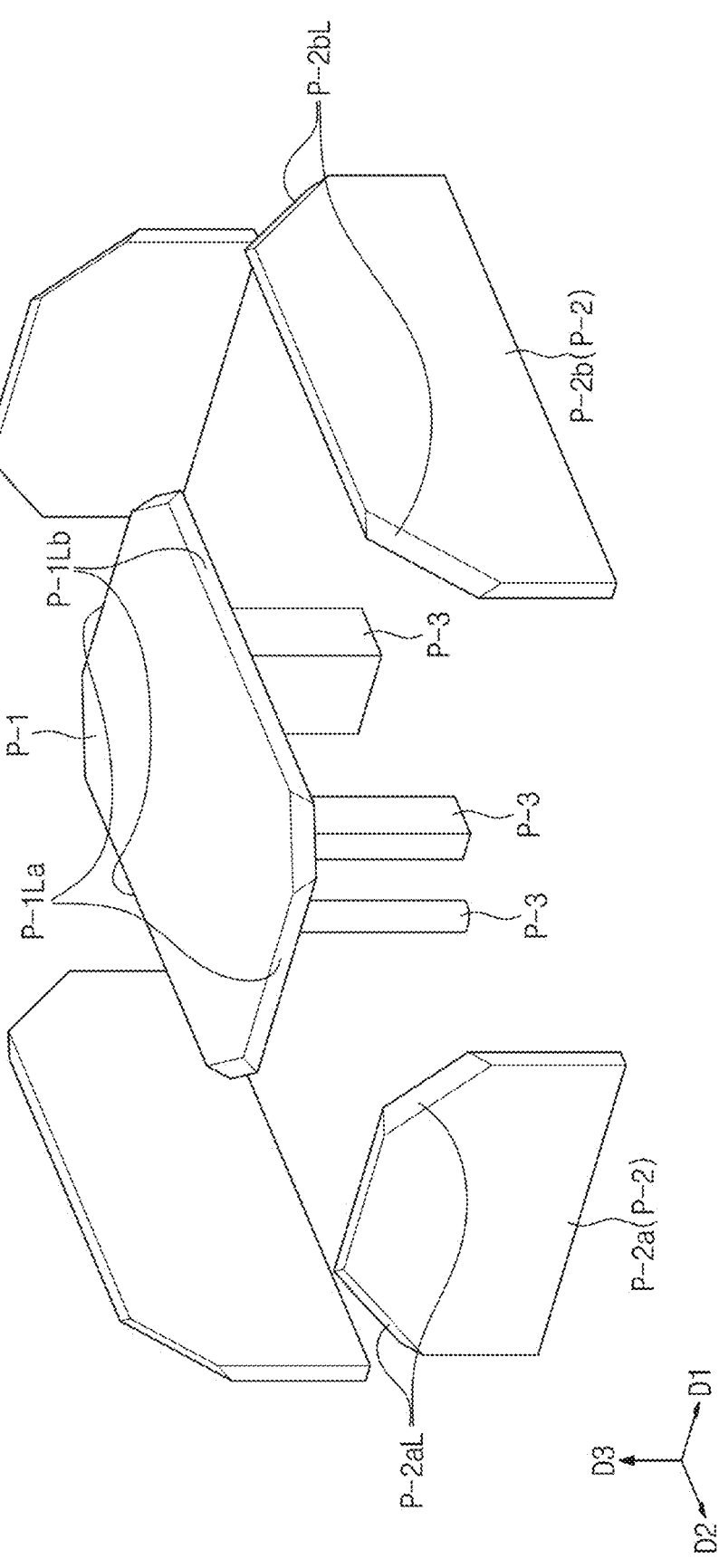
FIG. 4B is an exploded perspective view of the molding unit in FIG. 4A.

FIG. 4A is a perspective view illustrating another embodiment of a molding unit MU of a display device manufacturing apparatus according to an embodiment of the invention, and FIG. 4B is an exploded perspective view of the molding unit MU in FIG. 4A.

Referring to FIGS. 4A and 4B, the first part P-1 of the molding unit MU according to an embodiment of the invention may include edges P-1La and P-1Lb.

Specifically, the edges P-1La and P-1Lb are provided with a pair of first edges P-1La extending in the first direction D1, and a pair of second edges P-1Lb extending in the second direction D2. The first edges P-1La of the first part P-1 may be supported by first frames P-2a of the second part P-2 to be described later, and the second edges P-1Lb of the first part P-1 may be supported by second frames P-2b of the second part P-2 to be described later. As illustrated, the openings MU_OP' may be defined between the first edges P-1La and the second edges P-1Lb, and, although not illustrated, may be defined in the first edges P-1La or the second edges P-1Lb in another embodiment.

The second part P-2 may include a plurality of frames P-2a and P-2b, and specifically, may be composed of first frames P-2a bent from the first edges P-1La and second frames P-2b bent from the second edges P-1Lb. The first frames P-2a of the second part P-2 may extend to positions adjacent to the first edges P-1La of the first part P-1 on the rear surface DP_B of the display panel DP. The second frames P-2b may extend to positions adjacent to the second edges P-1Lb of the first part P-1 on the rear surface DP_B of the display panel DP.

The pair of first frames P-2a are disposed to face each other, and the pair of second frame P-2b are disposed to face each other. The injection space E-S is defined between the pair of first frames P-2a and the pair of second frames P-2b.

As illustrated in the drawing, the first frames P-2a and the second frames P-2b may extend in the third direction D3 on the rear surface DP_B of the display panel DP, but is not limited to what is illustrated the drawing. According to another embodiment, the first frames P-2a and the second frames P-2b may be bent, and are not limited to any one embodiment of the invention.

The first frames P-2a and the second frames P-2b may have an integrated shape, but is not limited thereto, and may have a separated shape from each other in another embodiment. Some edges of the first frames P-2a and the second frames P-2b are disposed adjacent to each other, and other edges thereof are disposed apart from each other. That is, edges P-2aL of the first frames P-2a and edges P-2bL of the second frames P-2b may be spaced apart from each other.

Empty spaces may be defined between the edges P-2aL of the first frames P-2a and the edges P-2bL of the second frames P-2b, which space the first frames P-2a and the second frames P-2b apart from each other, and openings MU_OP' may be defined in the empty spaces. That is, the openings MU_OP' for communicating with the injection space E-S are defined between the edges P-2aL of the first frames P-2a and the edges P-2bL of the second frames P-2b.

Likewise, the second part P-2 may be provided with the pair of first frames P-2a separable from each other and the pair of second frames P-2b separable from each other, and the openings MU_OP' may be defined between the edges P-2aL of the first frames P-2a and the edges P-2bL of the second frames P-2b.

Figure 5A:
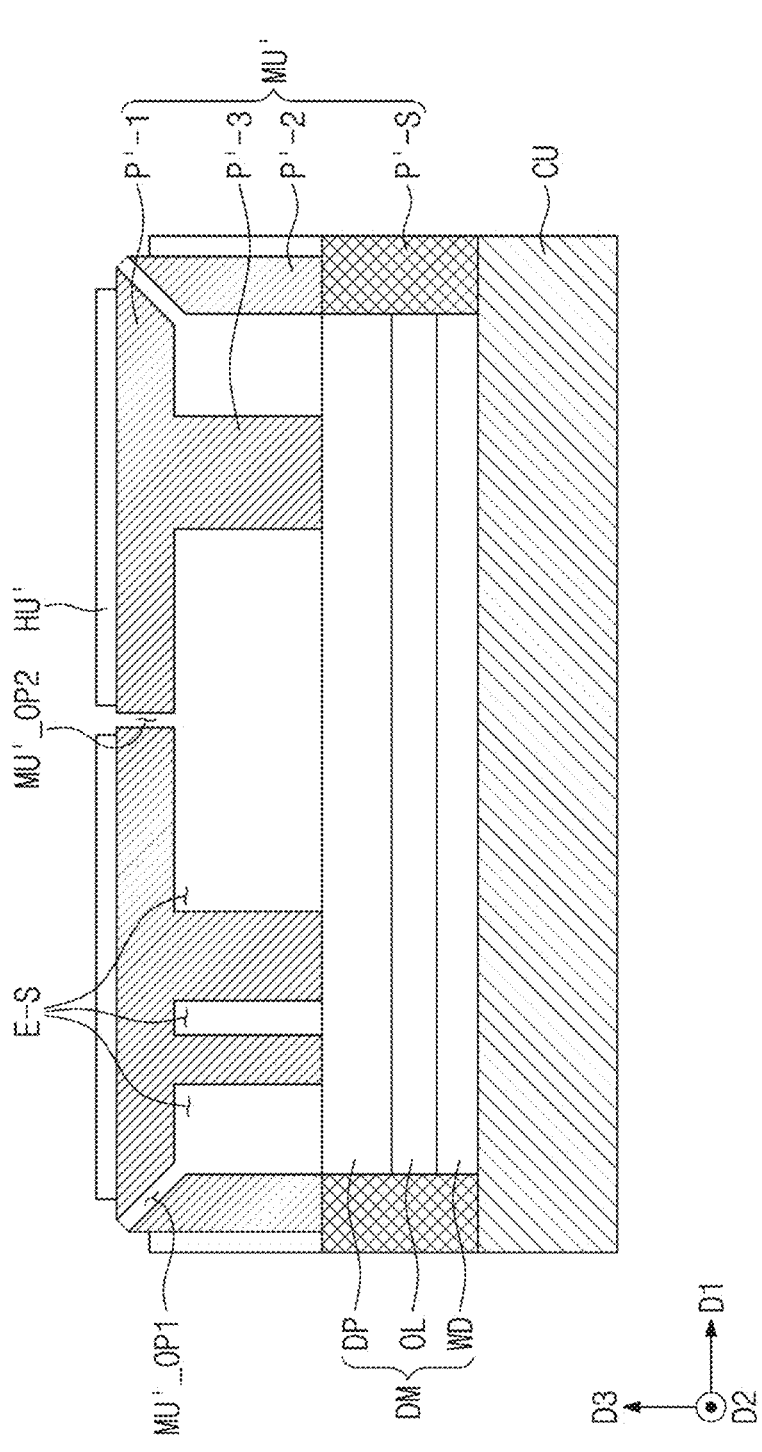
FIGS. 5A to 5C are schematic lateral views of a display device manufacturing apparatus according to an embodiment of the invention.
Figure 5B:
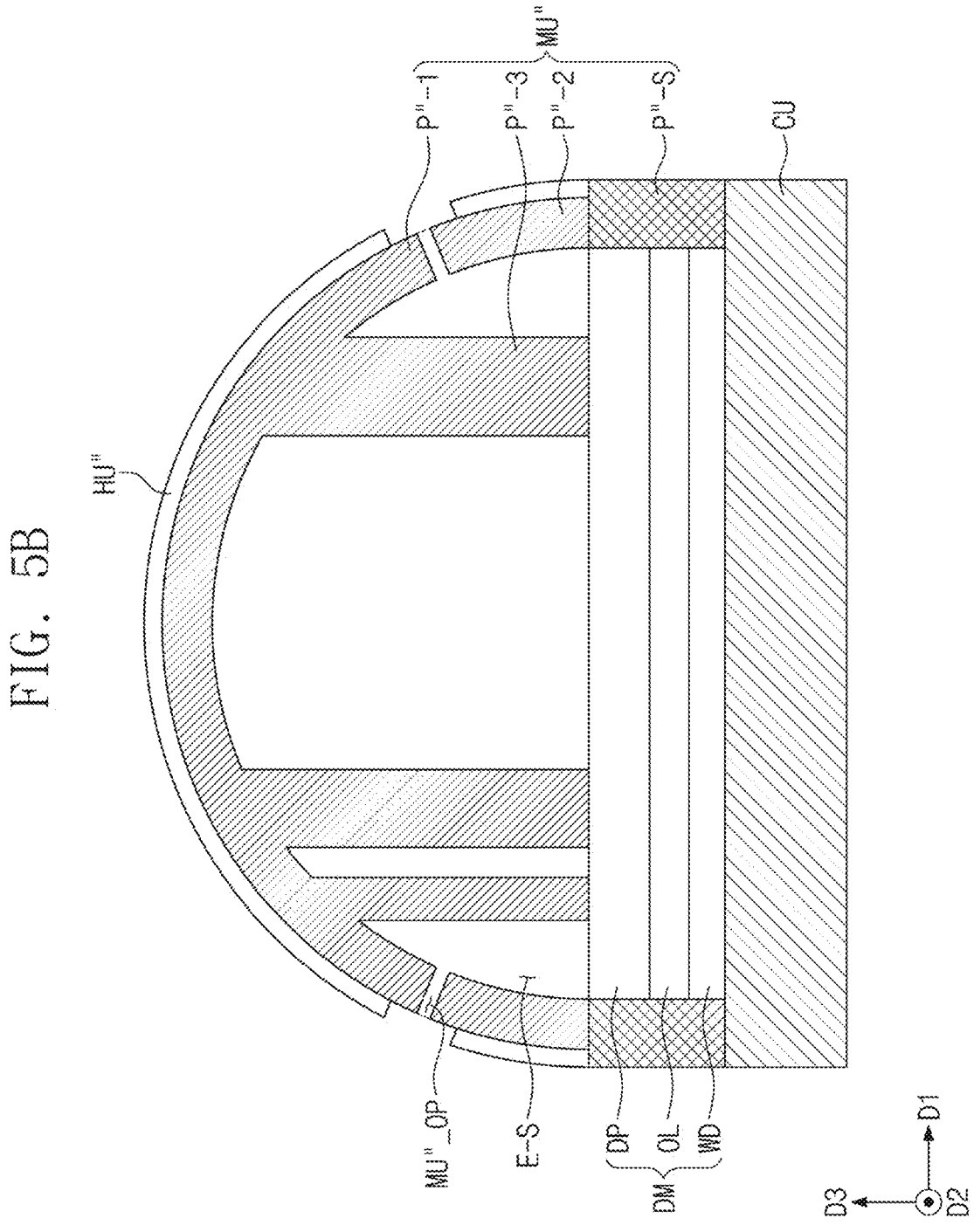
Figure 5C:
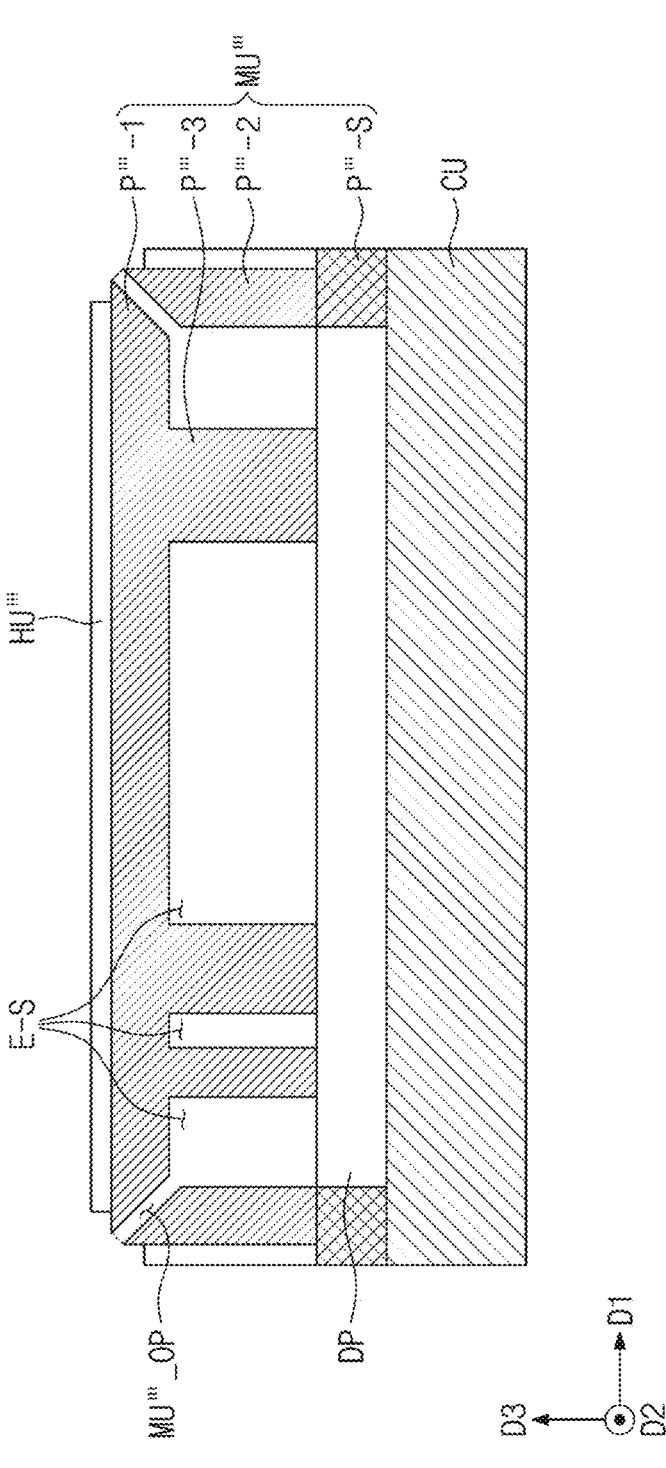

FIGS. 5A to 5C are schematic lateral views of a display device manufacturing apparatus according to an embodiment of the invention.

Referring to FIG. 5A, a molding unit MU' according to an embodiment of the invention may include a support part P'-S that supports the second part P-2.

The support part P'-S may be disposed on a side surface of the display panel DP, and may be disposed along the circumference of the side surface of the display panel DP.

The support part P'-S may be in contact with the side surface of the display panel DP. The second part P'-2 may be supported by the support part P'-S in a section where the support part P'-S is in contact with the side surface of the display panel DP. Since the support part P'-S is provided to be in contact with the side surface of the display panel DP, and the second part P'-2 is supported at the contact region, it is possible to prevent a step from occurring on the end during forming a cover panel.

The support part P'-S may have a shape integrated with the second part P'-2, but an embodiment of the invention is not limited thereto. The support part P'-S may have a shape separated from the second part P'-2 in another embodiment as illustrated in the drawing.

In addition, an opening defined in the molding unit MU' may be provided in plurality. The plurality of openings MU'_OP1 may be disposed at the corners of the first part P'-1, but an embodiment of the invention is not limited thereto. A plurality of openings MU'_OP2 may further be disposed at the center of the first part P'-1. A plurality of third parts P'-3 may be extended from the first part P'-1.

When a resin is injected into openings MU'_OP1 and MU'_OP2 through the injection unit IU, the resin may be rapidly injected into the openings MU'_OP1 and MU'_OP2 up to a predetermined amount or level of the injection space E-S. That is, the resin may be simultaneously injected through the plurality of openings MU'_OP1 and MU'_OP2, thereby reducing injection process time and improving mass productivity.

Referring to FIG. 5B, the molding unit MU" of a display device manufacturing apparatus according to an embodiment of the invention may have a dome shape.

Specifically, the first part P"-1 of the molding unit MU" may have a bent shape on a cross-section perpendicular to the rear surface DP_B of the display panel DP.

In addition, the second part P"-2 of the molding unit MU" may be bent without extending in the third direction D3, which is a direction perpendicular to the rear surface DP_B of the display panel DP, as illustrated in the drawing, but is not limited to being bent toward the inside of the injection space E-S, as illustrated in the drawing. The second part P"-2 of the molding unit MU" may be bent toward the outside of the injection space E-S, and is not limited to an embodiment of the invention.

In this case, the heating unit HU" may have a shape corresponding to the shape of the molding unit MU". A plurality of third parts P"-3 may extend from the first part P"-1, the openings MU" OP may be defined between the first part P"-1 and the second part P"-2, and the support P"-S may be disposed on a side surface of the display panel DM to support the second part P"-2.

Referring to FIG. 5C, the cooling unit CU of a display device manufacturing apparatus according to an embodiment of the invention may be disposed to directly abut the front surface of the display panel DP.

The molding unit MU'" and the heating unit HU'" according to an embodiment of the invention illustrated in FIG. 5C correspond to the molding unit MU and the heating unit HU illustrated in FIGS. 2 and 5A. The same reference numerals or symbols will be given to the components described above, and detailed description thereof will be omitted.

Specifically, the cooling unit CU may be disposed to abut the front surface of the display panel DP, without being disposed to abut the window WD.

This may maximize a cooling effect of the display panel DP through the cooling unit CU. The damage of the display panel DP may be prevented by suppressing the temperature of the display panel DP from exceeding a predetermined temperature.

Hereinafter, a display device manufacturing method according to an embodiment of the invention will be described. In description of a display device manufacturing method according to an embodiment, the same reference numerals or symbols will be given to the components described above, and detailed description thereof will be omitted.

Figure 6:
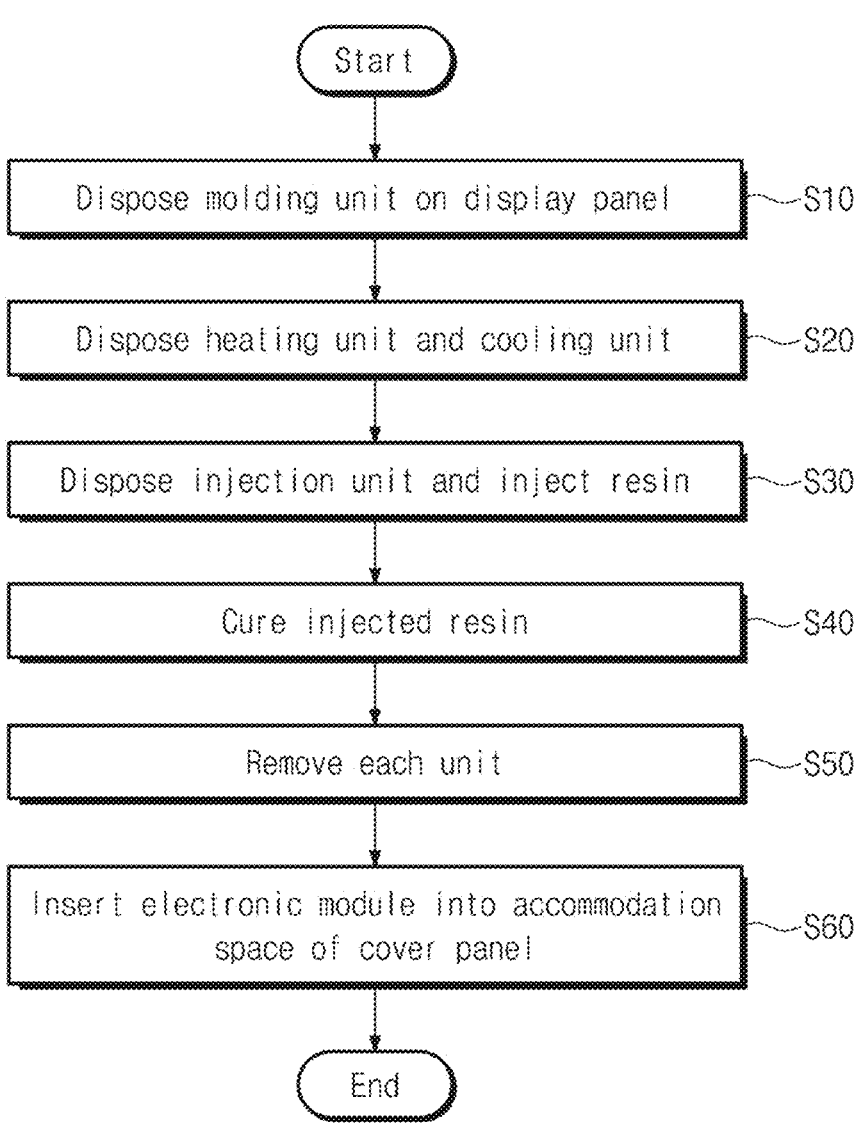
FIG. 6 is a flowchart of a display device manufacturing method according to an embodiment of the invention.

FIG. 6 illustrates a flowchart of a display device manufacturing method according to an embodiment of the invention, and FIGS. 7A to 7F are schematic lateral views illustrating the display device manufacturing method according to an embodiment of the invention.

Referring to FIG. 6, a display device according to the invention may be manufactured through an operation (S10) of disposing a molding unit on a display panel DP, an operation (S20) of disposing a heating unit and a cooling unit on the display panel DP, an operation (S30) of disposing an injection unit on the molding unit, and injecting a resin into an injection space through an opening, an operation (S40) of curing the injected resin, an operation (S50) of removing each unit, and an operation (S60) of inserting an electronic module EM into an accommodation space CVP_OP of a cover panel.

As illustrated in the drawing, a display device according to the invention may be manufactured through the above operations, but an additional operation such as an operation of removing at least a part of a cured resin may be performed between operations, and an embodiment of the invention is not limited thereto.

Figure 7A:
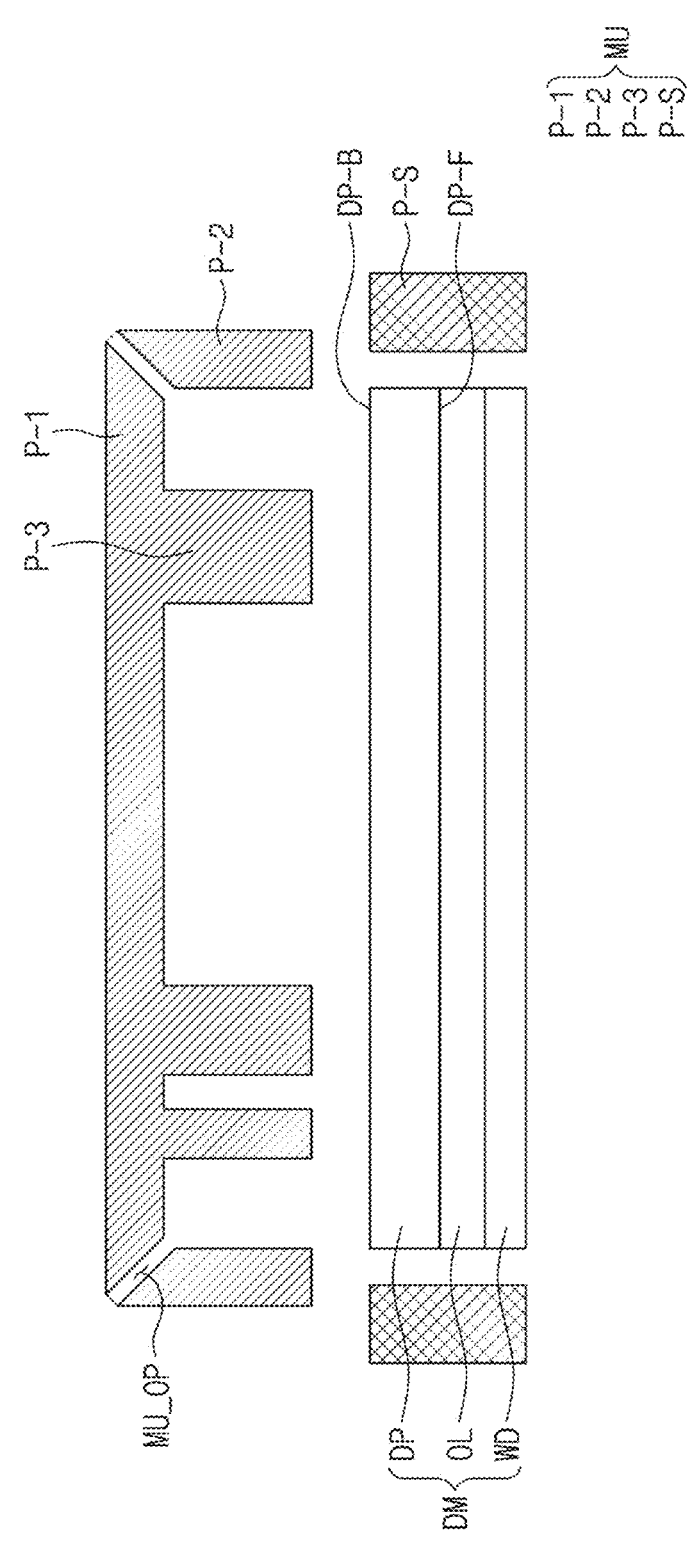

Referring to FIG. 7A, the method may include the operation (S10) of disposing a display panel DP on a molding unit MU.

As illustrated in the drawing, an optical layer OP or a window WD may be disposed on a front surface of the display panel DP, but an embodiment of the invention is not limited thereto, and the display panel DP may be present alone without the optical layer OP or the window WD in another embodiment.

A first part P-1 to a third part P-3 and a support part P-S of the molding unit MU may be integrally formed, but an embodiment of the invention is not limited thereto, and each part may be separably composed in another embodiment. In addition, each component may be disposed on the display panel DP in an integrally coupled state, but an embodiment of the invention is not limited thereto, and each part may be disposed on the display panel DP in a separated state and may be coupled in another embodiment.

The molding unit MU disposed on the display panel DP is not limited to the molding unit MU illustrated in FIG. 7A, and may be used as molding units MU', MU", and MU'" illustrated in FIGS. 4 and 5 and is not limited to any one embodiment.

Figure 7B:
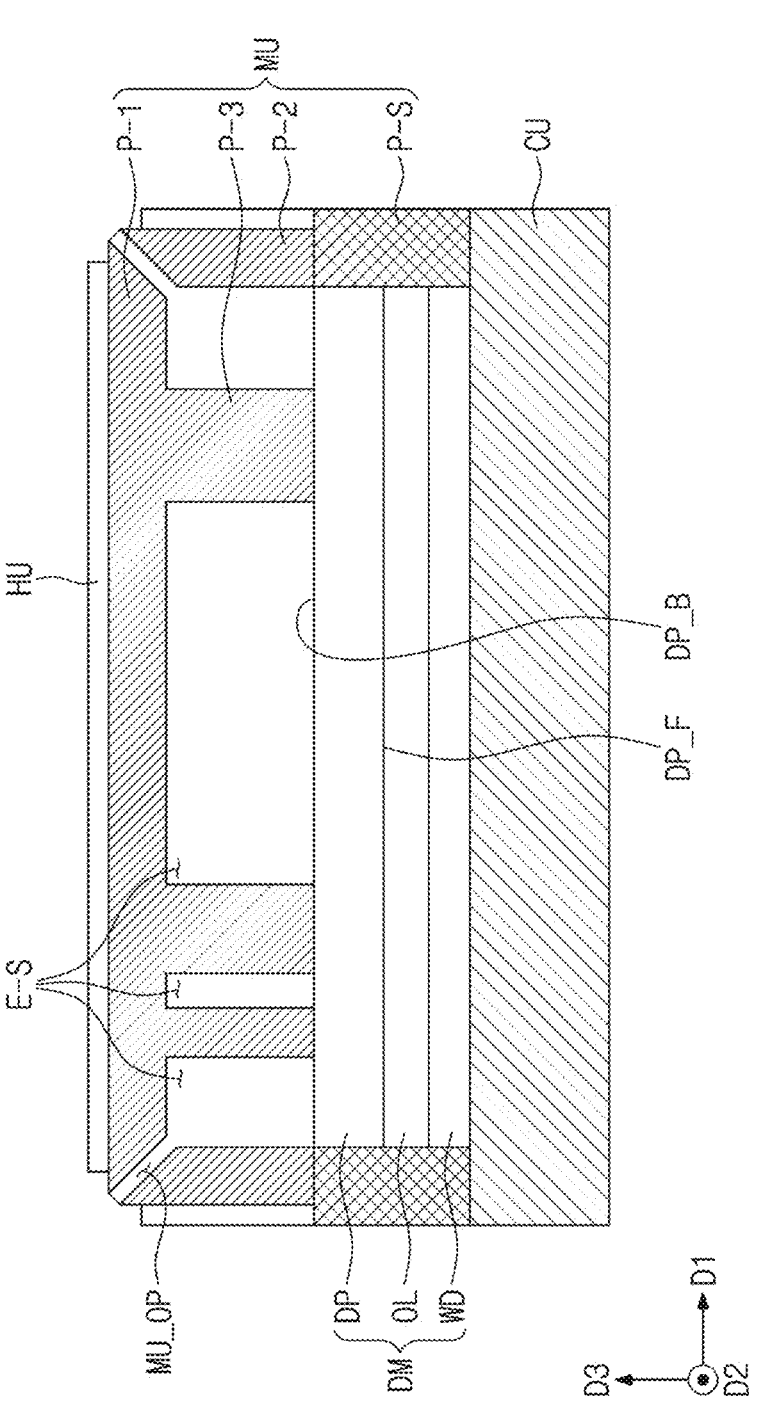

Referring to FIG. 7B, the method may include the operation (S20) of disposing a heating unit HU and a cooling unit CU on the display panel DP.

The heating unit HU may be disposed on the molding unit MU, and the cooling unit CU may be disposed on a front surface DP_F of the window WD.

As illustrated in the drawing, the heating unit HU disposed on the molding unit MU may be disposed not only outside the molding unit MU, but also inside the molding unit MU, and is not limited to any one embodiment.

In addition, as illustrated in the drawing, the cooling unit CU may be disposed on the window WD, but is not limited thereto, and may be disposed on the front surface DP_F of the display panel DP, or a front surface of a release film adhered to the display panel DP in another embodiment. In this case, the window WD may be adhered to the display panel DP, after the cover panel CVP is formed.

Figure 7C:
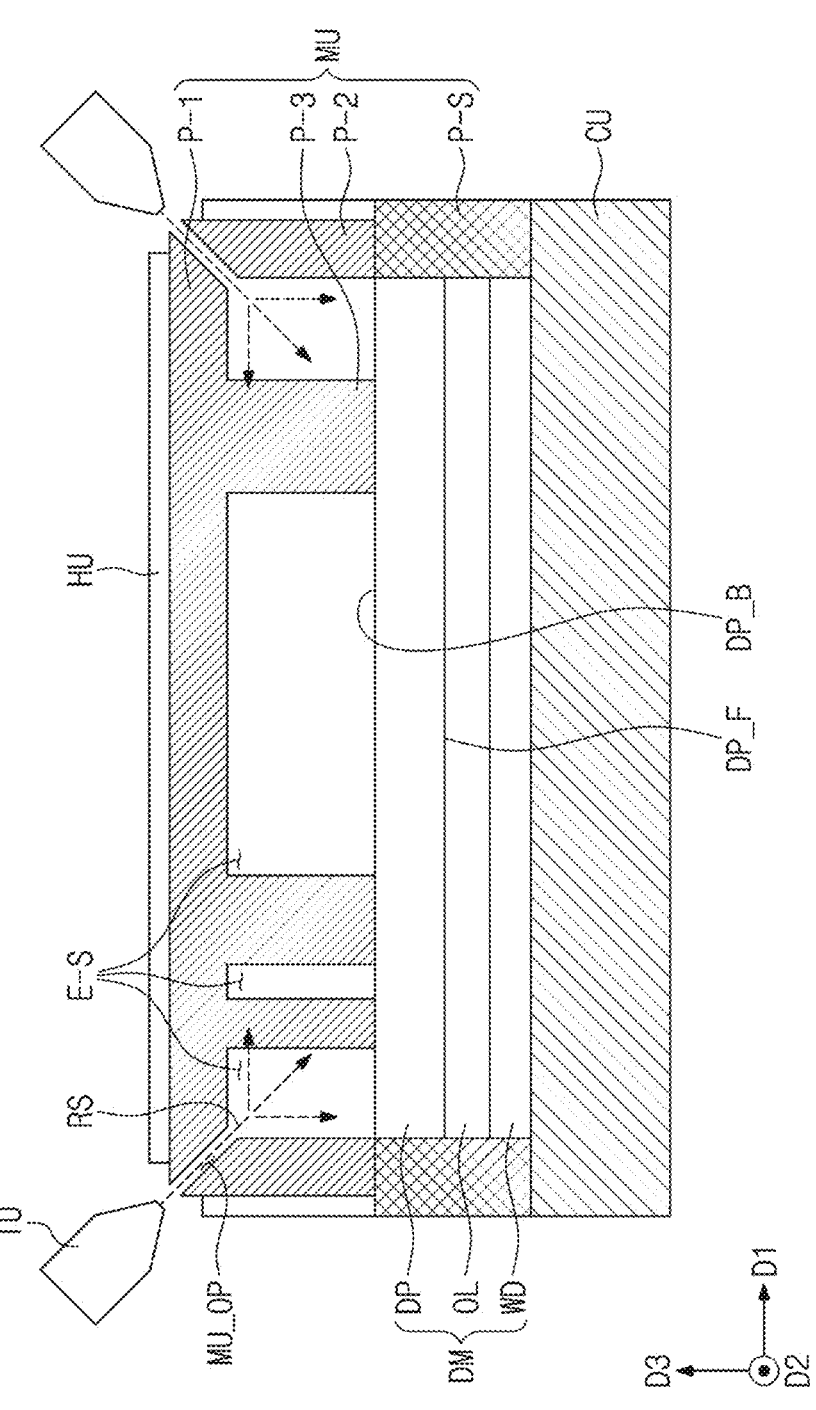

Referring to FIG. 7C, the method may include the operation (S30) of disposing an injection unit IU in the molding unit MU, and injecting a resin RS into the injection space E-S through an opening MU_OP.

The injection unit IU may inject the resin RS into the injection space E-S through the opening MU_OP for communicating with the injection space E-S. At this time, an injection direction is not limited to what is illustrated in the drawing, and the resin RS may be injected into the injection space E-S in various directions.

Here, as illustrated in the drawing, the opening MU_OP may be defined on a corner of the first part P-1 of the molding unit MU, but an embodiment of the invention is not limited thereto. The opening MU_OP may be defined on the center of the first part P-1 of the molding unit MU in another embodiment, and is not limited to any one embodiment.

In addition, a position of the injection unit IU is not limited to the corner of the first part P-1 of the molding unit MU, and the injection unit IU may be disposed on a position abutting the opening MU_OP.

Figure 7D:
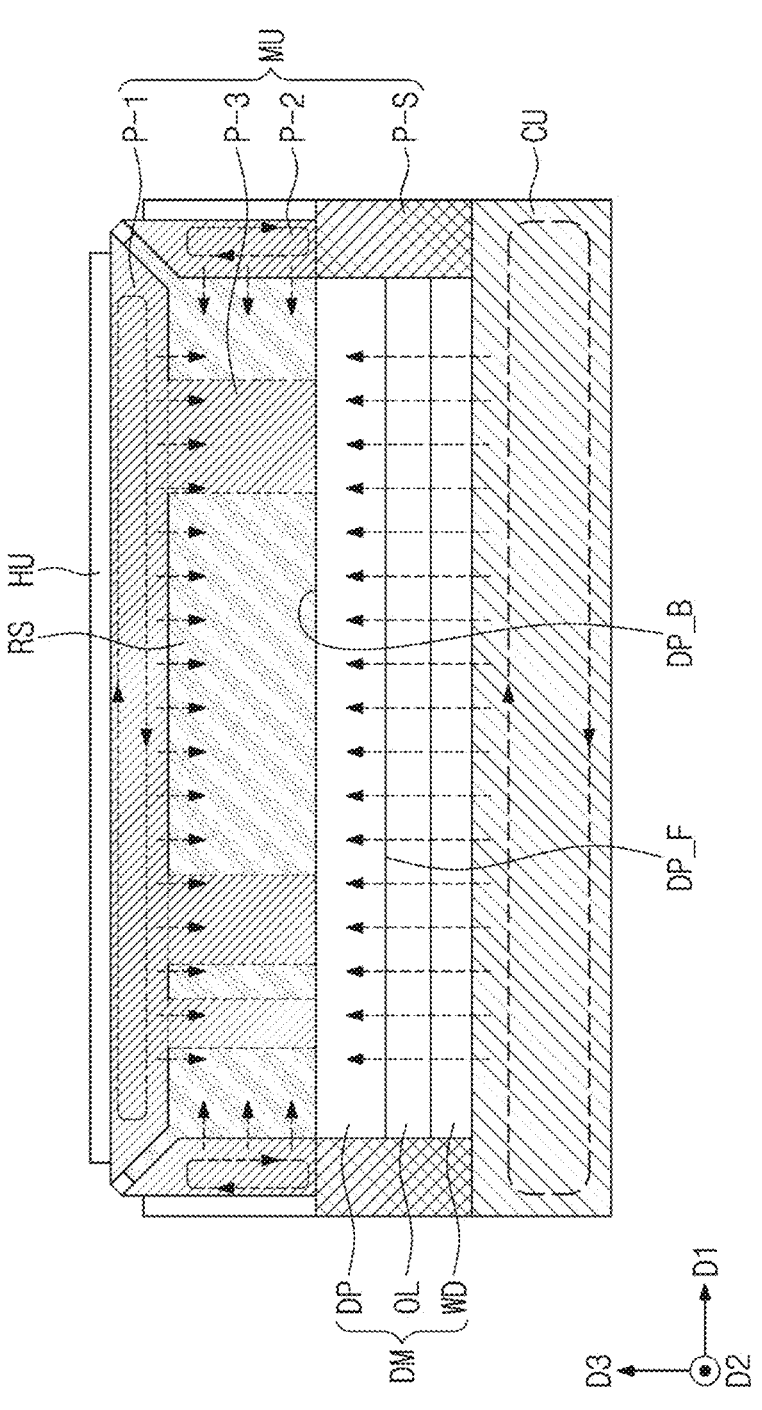

Referring to FIG. 7D, the method may include the operation (S40) of curing the injected resin RS.

The heating unit HU may cure the injected resin RS by heating. At this time, the heating unit HU may indirectly heat the resin RS by heating the molding unit MU, but is not limited thereto. The heating unit HU may directly heat the resin RS in another embodiment.

The resin RS may be heated by the heating unit HU, and may be cured to conform the shape of the injection space E-S. In this case, the resin RS may also be cured in the opening MU_OP for communicating with the injection space E-S. At this time, the resin RS being heated may form a single layer on the rear surface DP_B of the display panel DP.

The heating unit HU may increase the temperature of the injected resin RS to about 75 degrees in Celsius (° C.) or higher, and may cause the injected resin RS to be thermally cured. The heating unit HU enables the injected resin RS to be thermally cured at a high temperature of about 75° C. or higher, thereby preventing curing time delay, and increasing mass productivity of the cover panel CVP.

The cooling unit CU may cool the display panel DP such that the temperature of the display panel DP does not exceed a predetermined temperature. The cooling unit CU may directly or indirectly cool the display panel DP.

Specifically, while the heating unit HU heats the resin RS to about 75° C. or higher, the cooling unit CU may cool the display panel DP such that the temperature of the display panel DP does not exceed about 75° C.

When the temperature of the display panel DP exceeds about 75° C., pixels provided in the display panel DP may be damaged. Accordingly, the cooling unit CU may cool the display panel DP such that the temperature of the display panel DP does not exceed about 75° C., thereby preventing the pixels from being damaged.

Figure 7E:
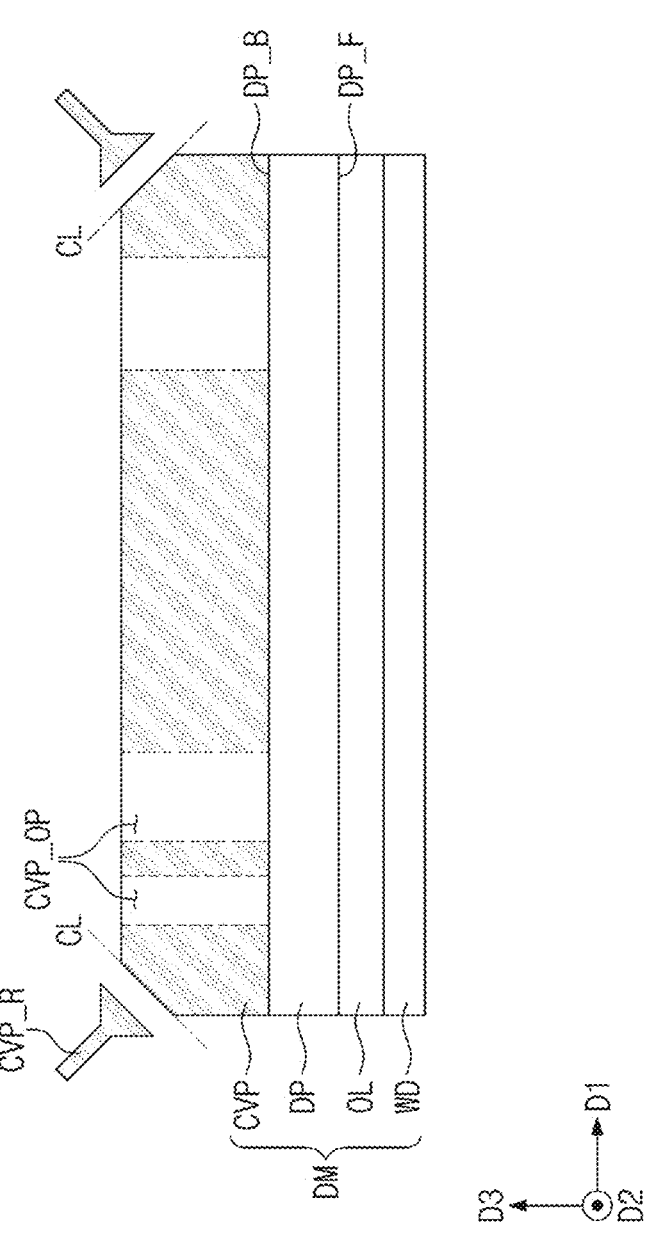

Referring to FIG. 7E, the method may include the operation of removing a protrusion CVP_R, of the cover panel CVP, composed of the cured resin RS.

Specifically, the operation (S50) of removing each unit MU, HU, and CU may include an operation of removing the protrusion CVP_R, of the cover panel CVP, composed of the cured resin RS.

Referring to FIG. 7E, when the resin RS injected into the injection space E-S is cured, the injected resin RS may be also cured in the opening MU_OP for communicating with the injection space E-S. Here, the cover panel CVP may include the protrusion CVP_R formed of the cured resin RS in the opening MU_OP. At this time, the protrusion CVP_R may be removed.

Specifically, as illustrated in FIG. 7E, the protrusion CVP_R may be removed along a cutting line CL.

In addition, although not illustrated in the drawing, an operation of planarizing an upper surface or a side surface of the cover panel CVP may be additionally performed, and this operation may produce the cover panel CVP having a thickness and a width suitable for product design dimensions.

Figure 7F:
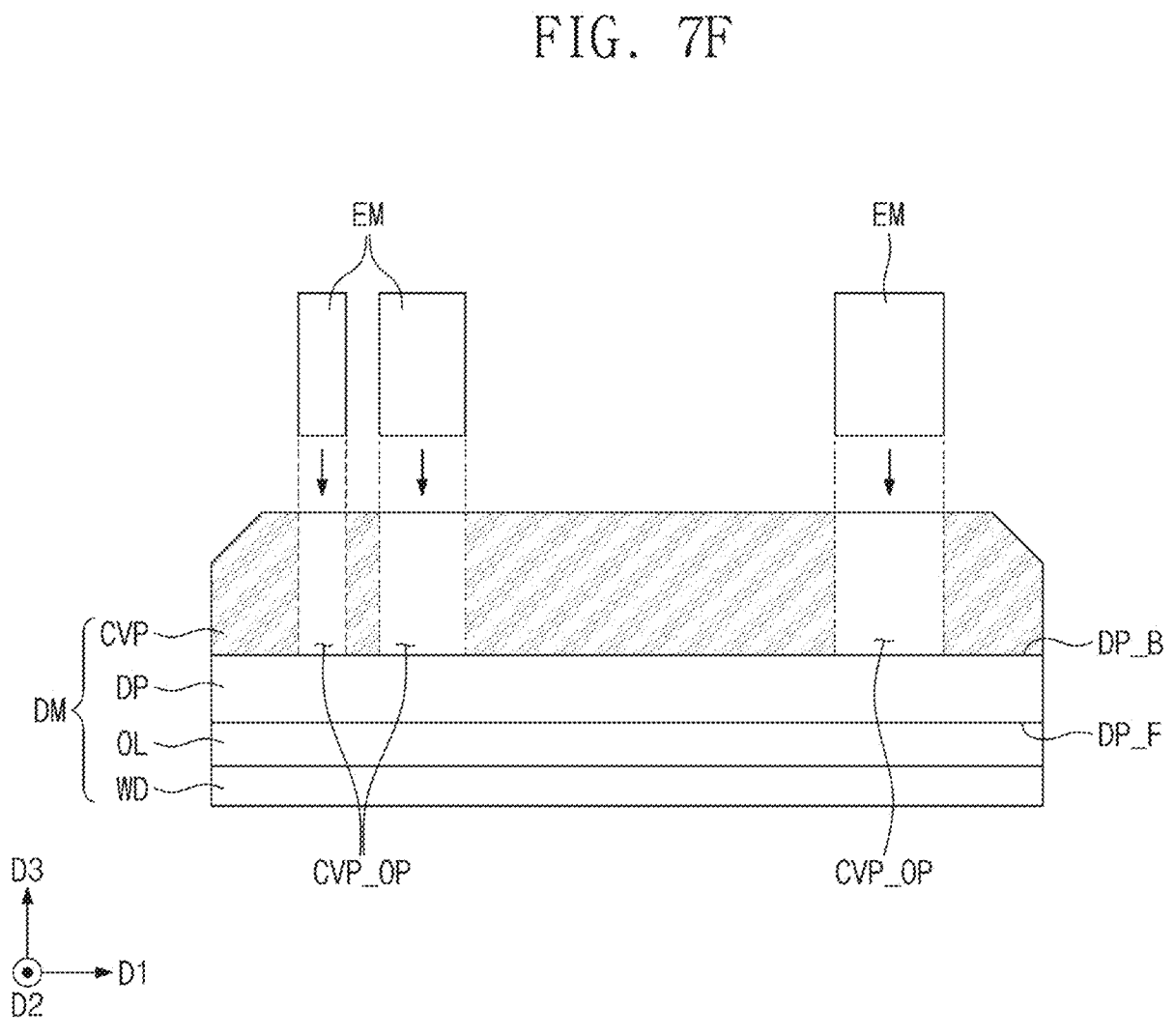

Referring to FIG. 7F, the method may include the operation of inserting an electronic module EM into the accommodation space CVP_OP of the cover panel CVP.

Referring to FIG. 7F, at least one accommodation space CVP_OP may be defined inside the cover panel CVP. As described above, the third part P-3 of the molding unit MU is disposed in the injection space E-S, and thus, in the disposed region, the accommodation space CVP_OP corresponds to an empty space in which the resin RS is not positioned. The number of the accommodation spaces CVP_OP corresponds to the number of the third parts P-3, and the shape of the accommodation space CVP_OP corresponds to the shape of the third part P-3.

The electronic module EM, and the like may be inserted into the accommodation space CVP_OP. The electronic module EM may be a camera sensor, a fingerprint sensor, or a motion sensor, but an embodiment of the invention is not limited thereto. The electronic module EM may include various sensors, or the like in another embodiment.

According to a display device manufacturing apparatus and a cover panel manufacturing method according to an embodiment of the invention, a cover panel may be manufactured in a thermal curing manner.

According to a display device manufacturing apparatus and a cover panel manufacturing method according to an embodiment of the invention, a cover panel may be manufactured in a thermal curing manner, thereby increasing mass productivity during a cover panel manufacturing process.

In the above, description has been made with reference to preferred embodiments of the invention, but those skilled in the art or those of ordinary skill in the relevant technical field may understand that various modifications and changes may be made to the invention within the scope not departing from the spirit and the technology scope of the invention described in the claims to be described later. Therefore, the technical scope of the invention is not limited to the contents described in the detailed description of the specification, but should be determined by the claims.

What is claimed is:

1. A display device manufacturing apparatus comprising:
   a cooling unit disposed on a front surface of a display panel, the display panel having a thickness;
   a molding unit disposed on a rear surface of the display panel; and a heating unit disposed on the molding unit, wherein the molding unit comprises a first part facing and spaced apart from the rear surface of the display panel by a predetermined distance, and a second part bent from the first part toward the rear surface of the display panel to define an injection space together with the first part, wherein an opening for communicating with the injection space is defined in the molding unit, wherein the cooling unit is stacked on the front surface of the display panel to be opposite the molding unit, the cooling unit being a predefined distance away from the first part, and wherein the predefined distance comprises the injection space and the thickness of the display panel.

2. The display device manufacturing apparatus of claim 1, wherein the molding unit further comprises a third part disposed in the injection space, and having one end adjacent to the rear surface of the display panel, and an opposite end connected to the first part.

3. The display device manufacturing apparatus of claim 1, wherein the first part comprises a plurality of edges, and the second part comprises a plurality of frames bent from the edges, respectively.

4. The display device manufacturing apparatus of claim 3, wherein the frames have an integrated shape.

5. The display device manufacturing apparatus of claim 4, wherein the opening is provided in plurality, and the plurality of openings are disposed in the edges of the first part.

6. The display device manufacturing apparatus of claim 3, wherein two edges of adjacent frames among the frames are spaced apart from each other to define the opening.

7. The display device manufacturing apparatus of claim 1, wherein the molding unit further comprises a support part disposed on a side surface of the display panel to support the second part.

8. The display device manufacturing apparatus of claim 7, wherein the support part has a shape integrated with the second part.

9. The display device manufacturing apparatus of claim 1, wherein the second part extends in a direction perpendicular to the rear surface of the display panel.

10. The display device manufacturing apparatus of claim 1, wherein the first part has a bent shape on a cross-section perpendicular to the rear surface of the display panel.

11. The display device manufacturing apparatus of claim 1, further comprising an injection unit, which abuts the opening.

12. The display device manufacturing apparatus of claim 1, further comprising a window disposed between the front surface of the display panel and the cooling unit.

13. A display device manufacturing method comprising:

disposing, on a display panel, a molding unit in which an opening for communicating with an injection space is defined, wherein the display panel has a thickness, wherein the molding unit includes a first part facing and spaced apart from a rear surface of the display panel by a predetermined distance, a second part bent from the first part toward the rear surface of the display panel to define the injection space together with the first part, and a third part disposed in the injection space, and having one end abutting the rear surface of the display panel, and an opposing end connected to the first part;

disposing a heating unit on the molding unit, and disposing a cooling unit on a front surface of the display panel;

disposing an injection unit in a position corresponding to the opening, and injecting, by the injection unit, a resin into the injection space; and heating the injected resin with the heating unit to cure the injected resin and cooling the display panel with the cooling unit;

wherein the cooling unit is stacked on the front surface of the display panel to be opposite the molding unit, the cooling unit being a predefined distance away from the first part, and wherein the predefined distance comprises the injection space and the thickness of the display panel.

14. The display device manufacturing method of claim 13, wherein the injected resin forms a single layer on the rear surface of the display panel.

15. The display device manufacturing method of claim 14, wherein the formed single layer forms at least one accommodation space therein, and the display device manufacturing method further comprises inserting an electronic module into the accommodation space.

16. The display device manufacturing method of claim 13, wherein the cooling of the display panel with the cooling unit comprises maintaining a temperature of the display panel to be about 75 degrees in Celsius (° C.) or lower.

17. The display device manufacturing method of claim 16, wherein the heating of the injected resin with the heating unit comprises maintaining the temperature of the injected resin to be about 75° C. or higher.

18. The display device manufacturing method of claim 13, further comprising removing the heating unit, the cooling unit, and the molding unit.

19. The display device manufacturing method of claim 18, wherein the removing of the molding unit further comprises cutting at least a part of the injected resin.

20. The display device manufacturing method of claim 13, wherein the first to third parts of the molding unit are integrally formed.

21. An electronic device for providing an image comprising:

a display device comprising:

a display panel; and a cover panel disposed on a rear surface of the display panel, wherein the display panel has a thickness, wherein the cover panel is formed by curing a resin injected into an injection space defined by a molding unit disposed on the rear surface of the display panel while a cooling unit is disposed on a front surface of the display panel, wherein the molding unit comprises a first part facing and spaced apart from the rear surface of the display panel by a predetermined distance, a second part bent from the first part toward the rear surface of the display panel to define the injection space together with the first part, and a third part disposed in the injection space, and having one end adjacent to the rear surface of the display panel, and an opposite end connected to the first part, wherein an opening for communicating with the injection space is defined in the molding unit, wherein the cooling unit is stacked on the front surface of the display panel to be opposite the molding unit, the cooling unit being a predefined distance away from the first part, and

wherein the predefined distance comprises the injection space and the thickness of the display panel.

\* \* \* \* \*